United States Patent
Goodman et al.

(10) Patent No.: US 7,626,895 B2
(45) Date of Patent: Dec. 1, 2009

(54) REMOVABLE MEDIA BATTERY PACK FOR POWERING A MEDIA ACCESSOR OF AN AUTOMATED DATA-STORAGE LIBRARY

(75) Inventors: Brian G. Goodman, Tucson, AZ (US); Michael P. McIntosh, Tucson, AZ (US); Daniel S. Moore, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 11/292,191

(22) Filed: Dec. 1, 2005

(65) Prior Publication Data

US 2007/0127346 A1     Jun. 7, 2007

(51) Int. Cl.
G11B 7/00      (2006.01)
G06F 19/00    (2006.01)

(52) U.S. Cl. .............. 369/30.65; 369/30.66; 360/69; 700/245; 700/213; 700/214

(58) Field of Classification Search .......... 369/30.38, 369/30.39, 30.44, 30.66, 30.65; 360/69; 360/71; 320/101; 429/9, 34, 23; 710/302; 700/245, 213, 214
See application file for complete search history.

(56) References Cited

U.S. PATENT DOCUMENTS

| | | | |
|---|---|---|---|
| 6,650,961 B2 * | 11/2003 | Deckers | 700/213 |
| 6,710,962 B1 * | 3/2004 | Caverly et al. | 360/69 |
| 6,909,940 B2 | 6/2005 | Hellman et al. | |
| 7,251,092 B2 * | 7/2007 | Reasoner et al. | 360/69 |
| 7,348,759 B2 * | 3/2008 | Ozeki | 320/101 |
| 2003/0217210 A1 * | 11/2003 | Carau, Sr. | 710/302 |
| 2005/0008903 A1 * | 1/2005 | Bourilkov et al. | 429/9 |

OTHER PUBLICATIONS

Thenerds.net, Lenovo, TP Ultrabay Slim-Lipo Batt, T40 Only, Mfg Part # (08K8190), $110.03.

* cited by examiner

*Primary Examiner*—Hoa T Nguyen
*Assistant Examiner*—Kim-Kwok Chu
(74) *Attorney, Agent, or Firm*—David W. Victor; Konrad Raynes & Victor LLP

(57) ABSTRACT

A removable media battery pack for supplying power to a media accessor of an automated data storage library. A media shell of the removable media battery pack has a structural configuration operable to be physically engaged by a media shell gripper of the media accessor. A rechargeable battery of the removable media battery pack is disposed within the media shell. A media shell interface of the removable media battery pack is integrated with the media shell and coupled to the rechargeable battery to provide power to the media accessor.

20 Claims, 13 Drawing Sheets

NON-RECHARGING MEDIA STORAGE SHELF
800

MEDIA STORAGE SLOT
801

FIG. 11
(PRIOR ART)

RECHARGING MEDIA STORAGE SHELF
810

MEDIA STORAGE SLOT/MEDIA STORAGE SLOT INTERFACE
811/812

FIG. 12

```
NON-GRIPPER INTERFACE MEDIA ACCESSOR
900

MEDIA SHELL GRIPPER
    901

ACCESSOR CONTROL CIRCUIT
    902
```

FIG. 13
(PRIOR ART)

```
GRIPPER INTERFACE MEDIA ACCESSOR
910

MEDIA SHELL GRIPPER/ MEDIA SHELL GRIPPER INTERFACE
    911/912

ACCESSOR CONTROL CIRCUIT
    902
```

FIG. 14

REMOVABLE MEDIA BATTERY PACK FOR POWERING A MEDIA ACCESSOR OF AN AUTOMATED DATA-STORAGE LIBRARY

FIELD OF INVENTION

The present invention generally relates to techniques for powering an automated data-storage library. The present invention specifically relates to such powering techniques that eliminate the use of cables between a media accessor of the library and other components of the library.

BACKGROUND OF THE INVENTION

Automated data-storage libraries are frequently utilized for the accessing and storage of various removable data media (e.g., magnetic tape cartridges and optical disk cartridges). Media accessors are employed to move the data media between media storage shelves and media drives. Historically, media accessors have been powered via a cable connection to a power source of the library. Currently, automated data-storage libraries are moving toward designs that do not have any cable connections between the media accessor and other components of the library. This is being done to simplify an upgrade of the library and to minimize the down time associated with the upgrade or service. Battery operated media accessors have been suggested where the accessor picks up and drop offs battery packs from battery charging cells. A problem with this approach is that carrying mechanisms need to be designed and life tested. Thus, there is a need for an improved method for handling battery packs in an automated data-storage library.

SUMMARY OF THE INVENTION

The present invention provides a new and unique wireless method for supplying power to a media accessor of an automated data-storage library.

One form of the present invention is a removable media battery pack for supplying power to a media accessor of an automated data storage library. The removable media battery pack includes a media shell, a rechargeable battery and a media shell interface. The media shell has a structural configuration operable to be physically engaged by a media shell gripper of the media accessor. The rechargeable battery is disposed within the media shell. The media shell interface is integrated with the media shell and coupled to the rechargeable battery to provide power to the media accessor.

A second form of the present invention is an automated data-storage library comprising a media accessor, and a removable media battery pack. The media accessor includes a media shell gripper. The removable media battery pack includes a media shell, a rechargeable battery and a media shell interface. The media shell has a structural configuration operable to be physically engaged by the media shell gripper. The rechargeable battery is disposed within the media shell. The media shell interface is integrated with the media shell and coupled to the rechargeable battery to provide power to the media accessor.

A third form of the present invention is an automated data-storage library comprising a storage shelf, a media accessor and removable media battery pack. The storage shelf includes a storage slot. The media accessor includes a media shell gripper. The removable media battery pack includes a media shell, a rechargeable battery and a media shell interface. The media shell has a structural configuration operable to be physically engaged by the media shell gripper and physically stored within the storage slot. The rechargeable battery is disposed within the media shell. The media shell interface is integrated with the media shell and coupled to the rechargeable battery to provide power to the media accessor.

The forgoing forms and other forms as well as objects, features and advantages of the present invention will become further apparent from the following detailed description of the various embodiments of the present invention, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 11 illustrates a block diagram of a non-recharging media storage shelf as known in the art;

FIG. 12 illustrates a block diagram of a recharging media storage shelf in accordance with the present invention;

FIG. 13 illustrates a block diagram of non-gripper interface media accessor as known in the art;

FIG. 14 illustrates a block diagram of a gripper interface media accessor in accordance with the present invention;

DETAILED DESCRIPTION OF THE PRESENT INVENTION

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

The invention will be described as embodied in an automated magnetic tape library storage system for use in a data processing environment. Although the invention shown uses magnetic tape cartridges, one skilled in the art will recognize the invention equally applies to optical disk cartridges or other removable storage media and the use of either different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Figure 1:
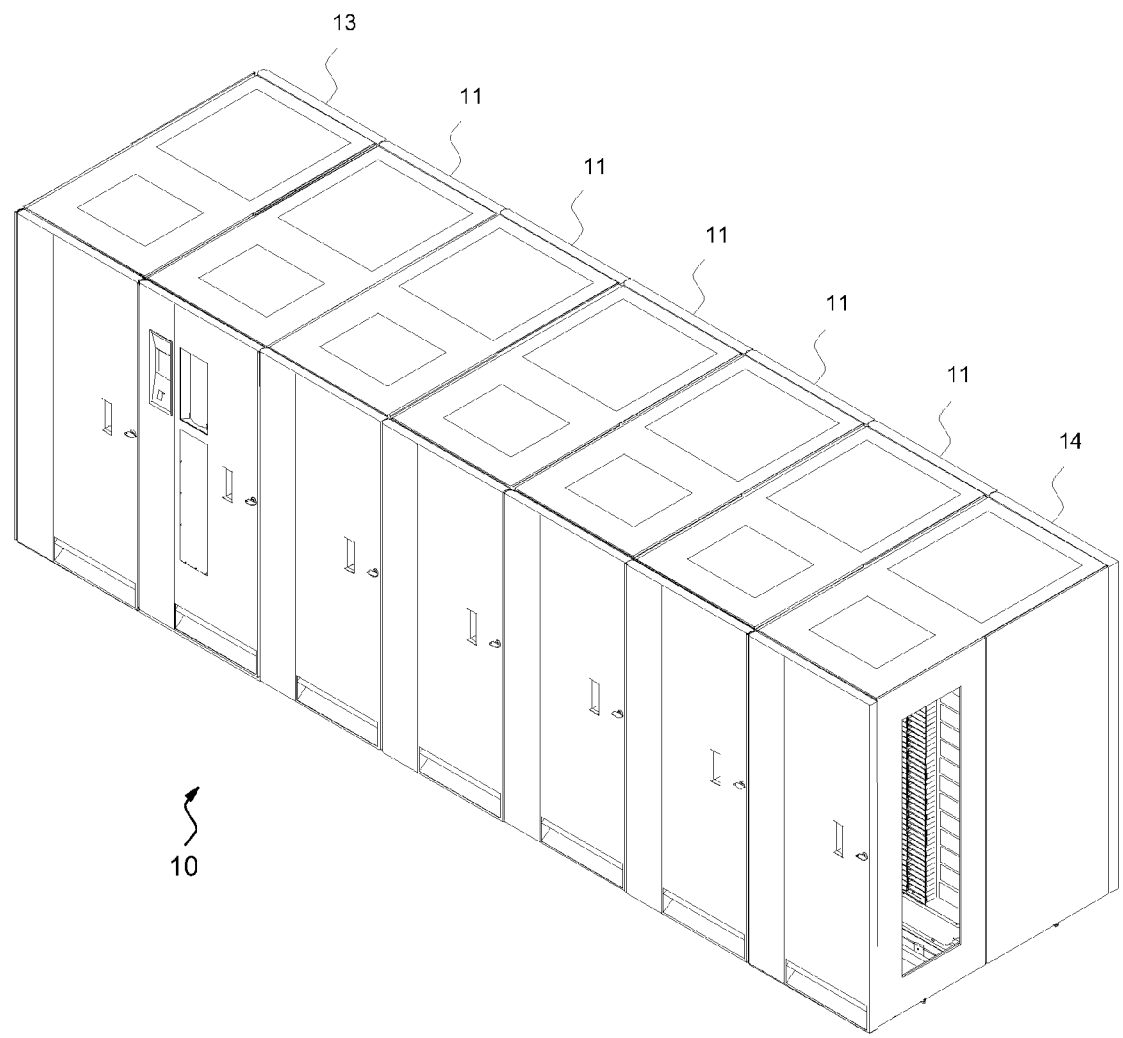
FIG. 1 is an isometric view of an automated data storage library adaptable to implement an embodiment of the present invention, with the view specifically depicting a library having a left hand service bay, multiple storage frames and a right hand service bay.
Figure 2:
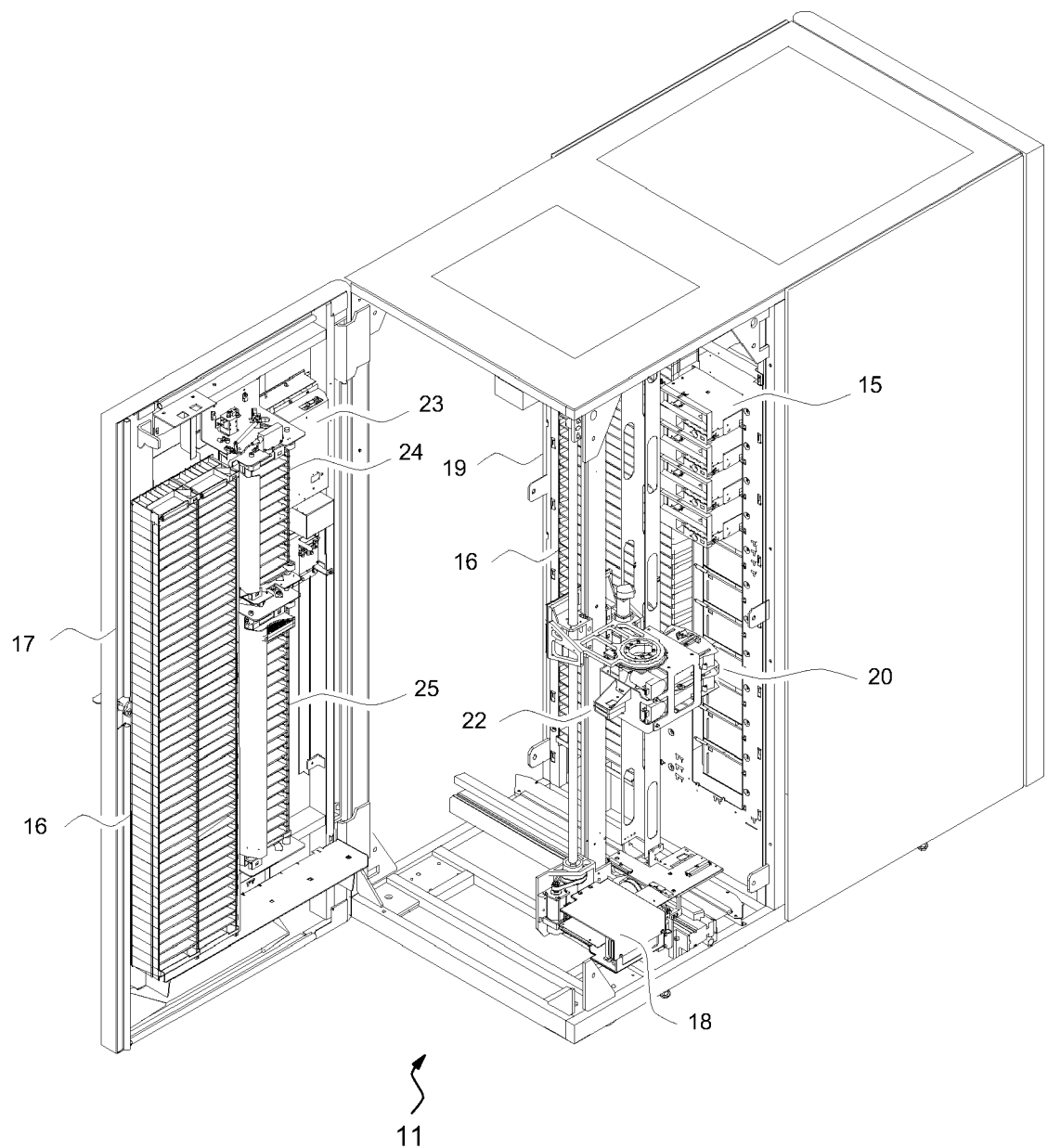
FIG. 2 is an isometric view of an automated data storage library adaptable to implement an embodiment of the present invention, with the view specifically depicting an exemplary basic configuration of the internal components of a library.

Turning now to the Figures, FIGS. 1 and 2 illustrate an automated data storage library 10 which stores and retrieves data storage cartridges containing data storage media (not shown) in storage shelves 16. It is noted that references to "data storage media" herein refer to data storage cartridges, and for purposes herein the two terms are used synonymously. An example of an automated data storage library which may implement the present invention, and has a configuration as depicted in FIGS. 1 and 2, is the IBM 3584 UltraScalable Tape Library. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage shelves, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage shelves 16 on front wall 17 and rear wall 19 for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage shelves 16 accessible by first accessor 18.

As described above, the storage frames 11 may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
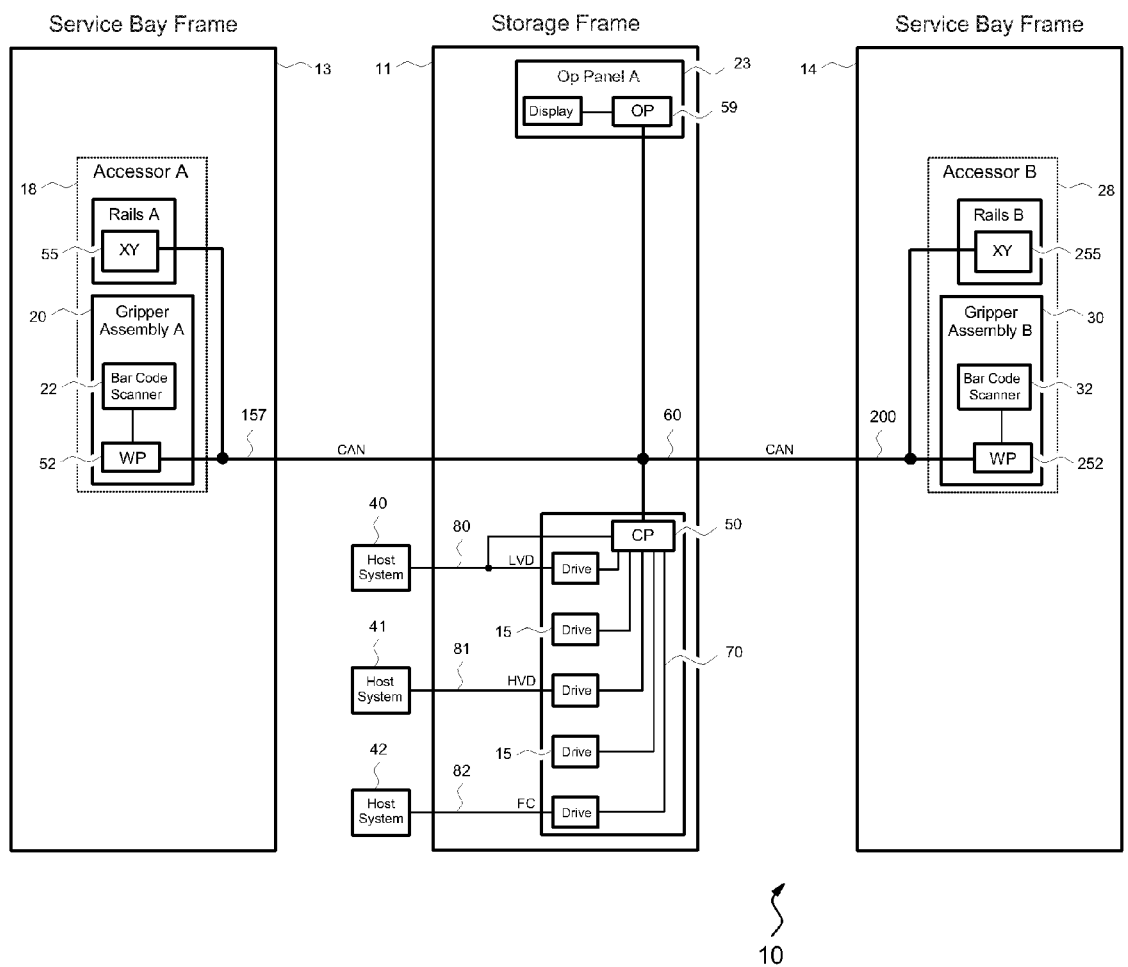
FIG. 3 is a block diagram of an automated data storage library adaptable to implement an embodiment of the present invention, with the diagram specifically depicting a library that employs a distributed system of modules with a plurality of processor nodes.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which implement the present invention, is the IBM 3584 UltraScalable Tape Library. For a fuller understanding of a distributed control system incorporated in an automated data storage library, refer to U.S. Pat. No. 6,356,803, which is entitled "Automated Data Storage Library Distributed Control System," which is incorporated herein for reference.

While the automated data storage library 10 has been described as employing a distributed control system, the present invention may be implemented in automated data storage libraries regardless of control configuration, such as, but not limited to, an automated data storage library having one or more library controllers that are not distributed, as that term is defined in U.S. Pat. No. 6,356,803. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems 40, 41 or 42. The host systems, such as host servers, may communicate with the library directly, e.g., on path 80, through one or more control ports (not shown), or through one or more data storage drives 15 on paths 81, 82, providing commands to access particular data storage media and move the media, for example, between the storage shelves 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage shelves 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 4:
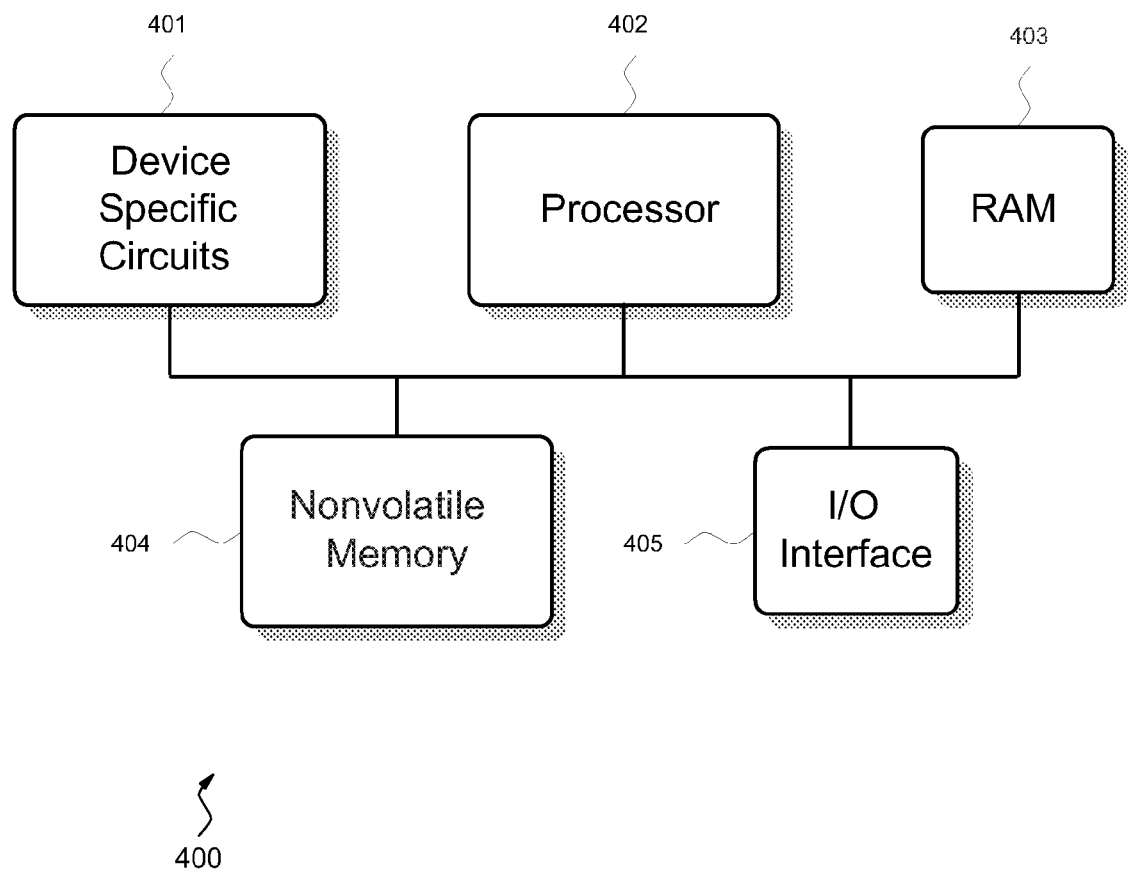
FIG. 4 is a block diagram depicting an exemplary controller configuration.

An automated data storage library 10 typically comprises one or more controllers to direct the operation of the automated data storage library. Host computers and data storage drives typically comprise similar controllers. A controller may take many different forms and may comprise, for example but not limited to, an embedded system, a distributed control system, a personal computer, or a workstation. Essentially, the term "controller" as used herein is intended in its broadest sense as a device that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, ROM (Read Only Memory), PROM (Programmable Read Only Memory), EEPROM (Electrically Erasable Programmable Read Only Memory), flash PROM (Programmable Read Only Memory), MRAM (Magnetoresistive Random Access Memory), battery backup RAM, hard disk drives, etc. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, RS-232 (Recommended Standard), USB (Universal Serial Bus), SCSI (Small Computer Systems Interface), Fibre Channel, CAN (Controller Area Network), Ethernet, RF (Radio Frequency), Infrared, etc. The device specific circuits 401 may provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), Ethernet support, etc. In addition, all or part of the device specific circuits 401 may reside outside the controller 400.

While the automated data storage library 10 is described as employing a distributed control system, the present invention may be implemented in various automated data storage libraries regardless of control configuration, such as, but not limited to, an automated data storage library having one or more library controllers that are not distributed. A library controller may comprise one or more dedicated controllers of a prior art library or it may comprise one or more processor nodes of a distributed control system. Herein, library controller may comprise a single processor or controller or it may comprise multiple processors or controllers.

Figure 5:
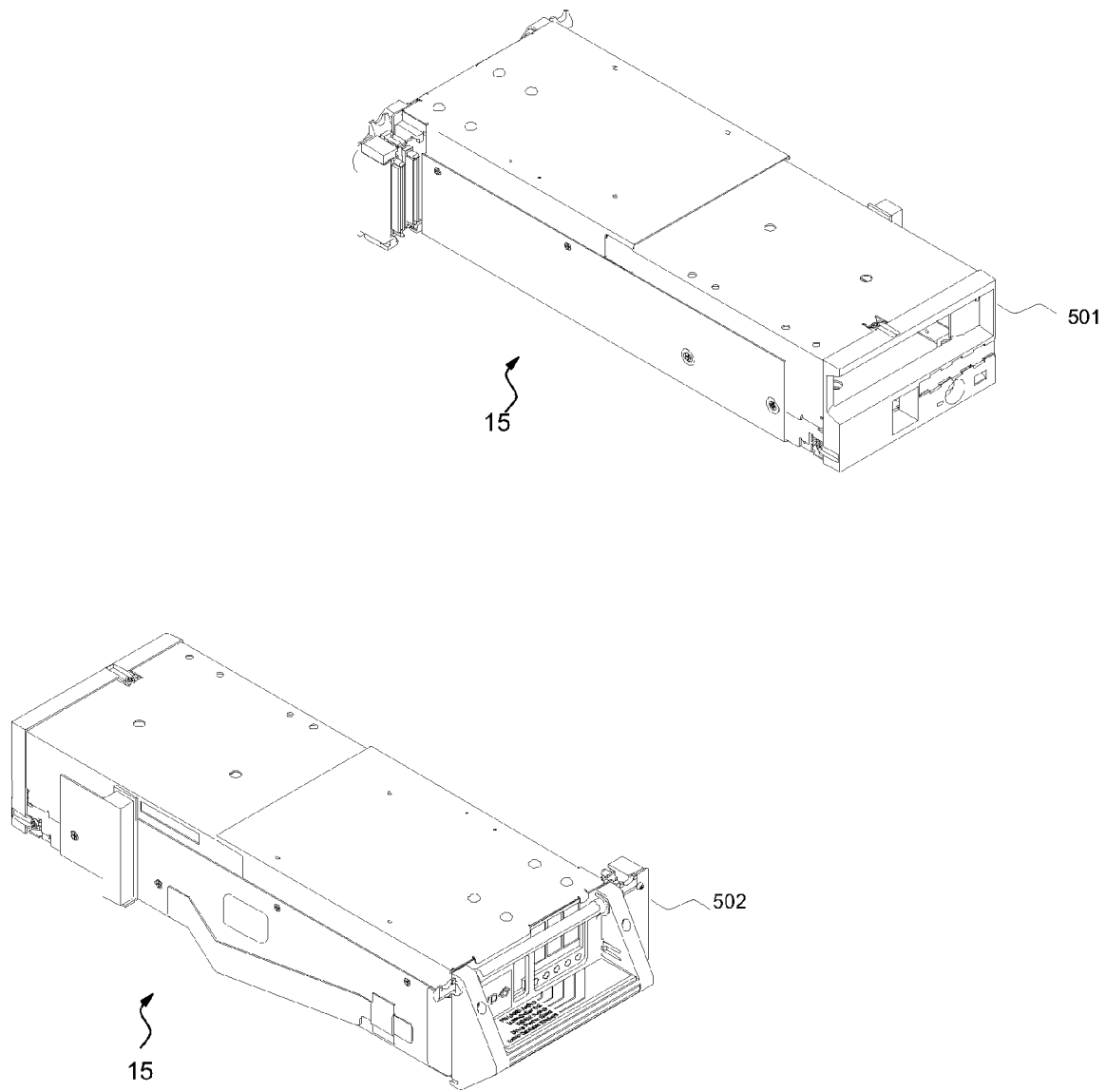
FIG. 5 is an isometric view of the front and rear of a data storage drive adaptable to implement an embodiment of the present invention.

FIG. 5 illustrates an embodiment of the front 501 and rear 502 of a data storage drive 15. In the example of FIG. 5, the data storage drive 15 comprises a hot-swap drive canister. This is only an example and is not meant to limit the invention to hot-swap drive canisters. In fact, any configuration of data storage drive may be used whether or not it comprises a hot-swap canister.

Figure 6:
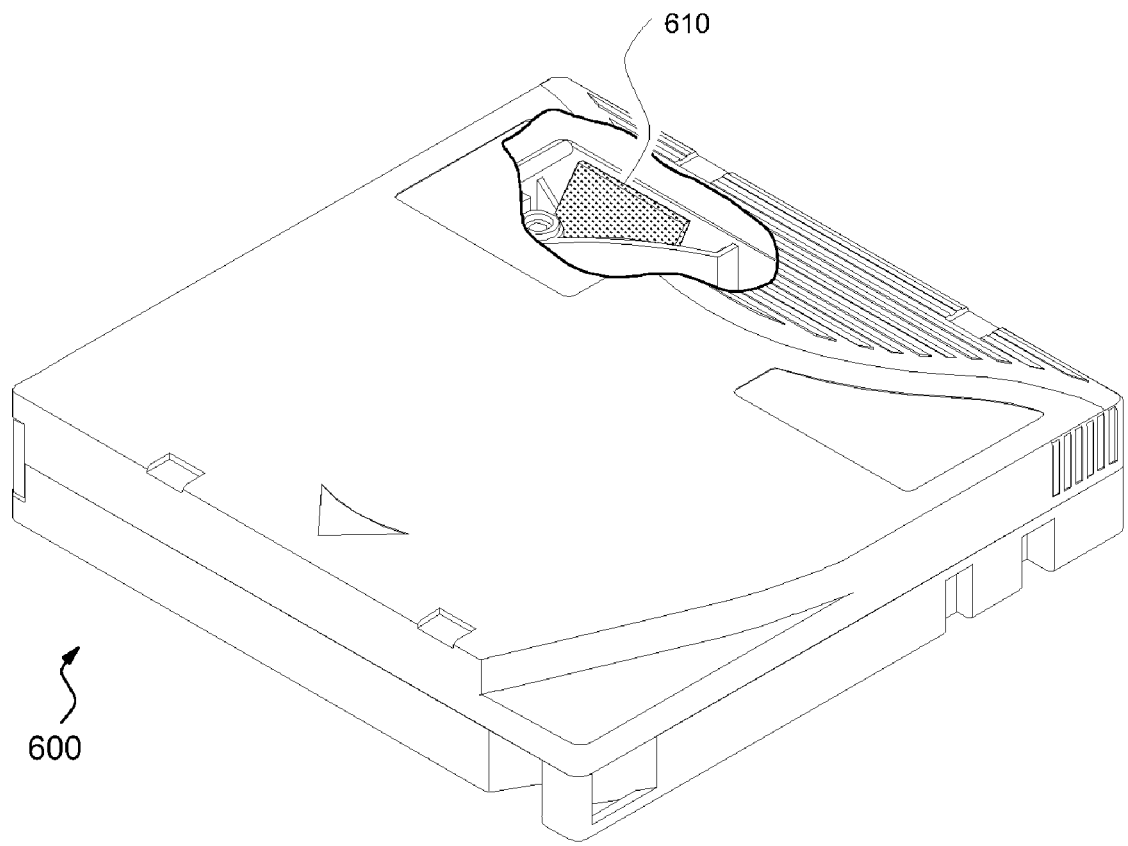
FIG. 6 is an isometric view of a data storage cartridge adaptable to implement an embodiment of the present invention.

FIG. 6 illustrates an embodiment of a data storage cartridge 600 with a cartridge memory 610 shown in a cutaway portion of the Figure. This is only an example and is not meant to limit the invention to cartridge memories. In fact, any configuration of data storage cartridge may be used whether or not it comprises a cartridge memory.

Figure 7:
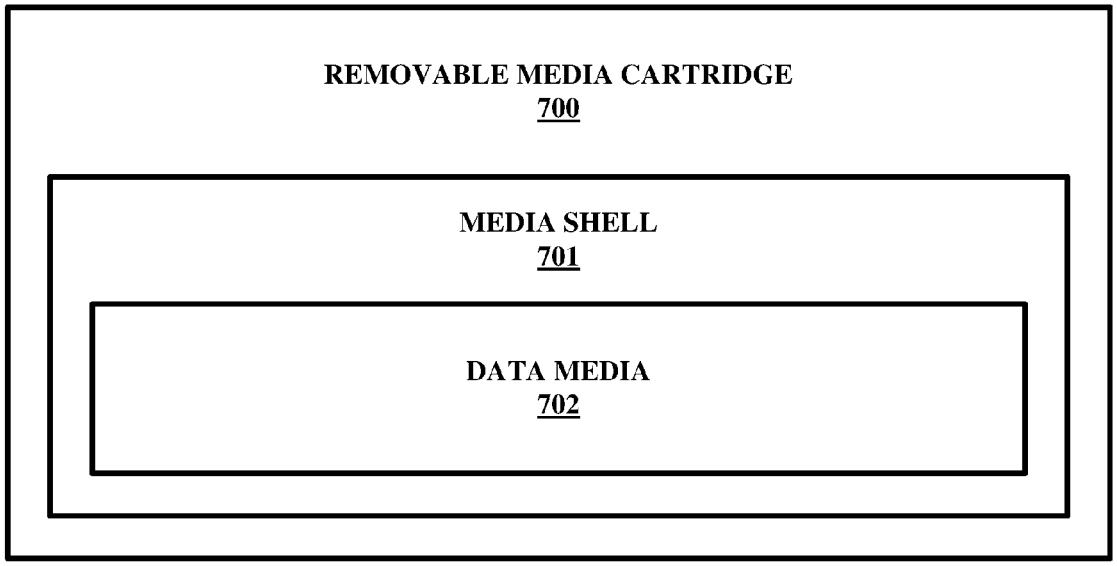
FIG. 7 illustrates a block diagram of a removable media cartridge as known in the art.

FIG. 7 illustrates a removable media cartridge 700 including a media shell 701 physically configured to be engaged by a media shell gripper of a media accessor as would be appreciated by those having ordinary skill in the art. Media shell 701 serves as a data media casing for a data media 702 disposed within media shell 701 for purposes of facilitating a reading of data recorded on data media 702 and/or a writing of data onto data media 702 as would be appreciated by those having ordinary skill in the art. An example of cartridge 700 is a LTO magnetic tape cartridge as known in the art.

Figure 8:
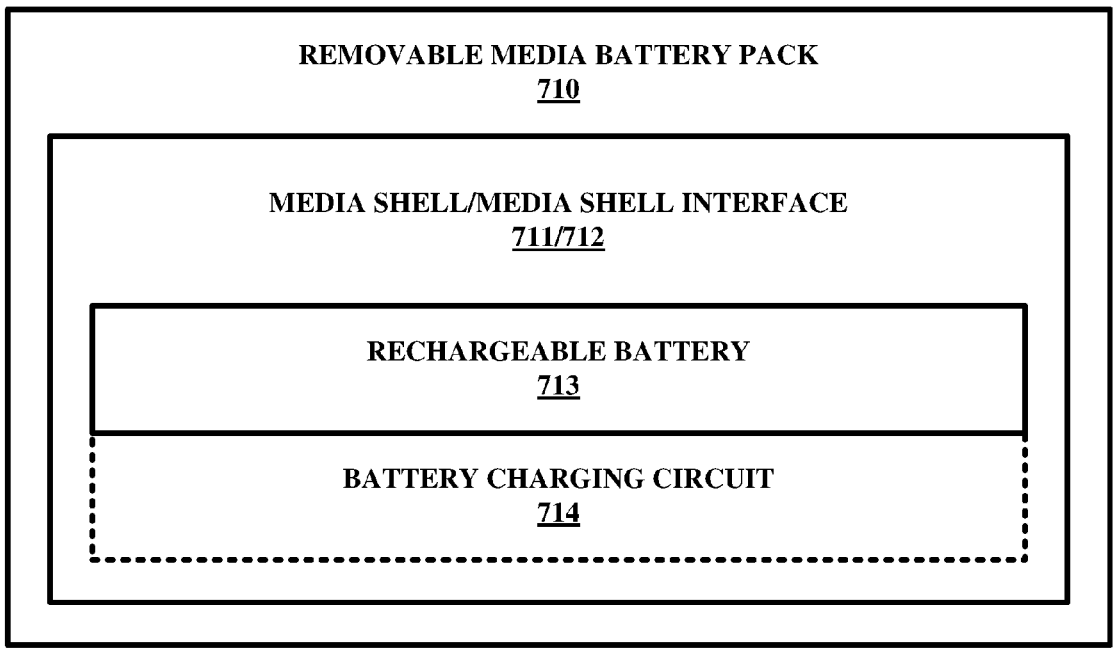
FIG. 8 illustrates a block diagram of a removable media battery pack in accordance with the present invention.

By comparison, FIG. 8 illustrates a removable media battery pack 710 of the present invention including a media shell 711 as a modification of media shell 701 (FIG. 7) involving an integration of a media shell interface 712 into media shell 701 without inhibiting the ability of a media shell gripper to physically engage media shell 701. This integration involves a combining of the media shell 701 and the media shell interface 712 to produce something that has elements of both (i.e. the media battery pack 710). Herein, integration refers to a combination of two or more parts or elements to create an element or part that has characteristics of both. An integrated part may comprise a single part or may comprise multiple parts that are coupled, mated, assembled or joined together, etc. This modification of media shell 701 provides removable media battery pack 710 with a physical configuration parallel to the physical configuration of cartridge 700 (FIG. 7) whereby the same media shell gripper of a media accessor is capable of transporting removable media cartridge 700 and removable media battery pack 710 as needed within an automated data storage library. Herein, the same gripper may refer to the same physical gripper, or may refer to different grippers with the same, or substantially similar, gripper designs.

Removable media battery pack 710 further includes a rechargeable battery 713 in the form of one or more Lithium Ion batteries, one or more Nickel Metal Hydride batteries, one or more lead acid batteries, one or more capacitors, one or more supercapacitors, one or more fuel cells, and/or any other rechargeable battery known to those having ordinary skill in the art. In one embodiment, media shell 711 includes the housing for rechargeable battery 713. For example, media shell 711 may be the battery housing itself. In another embodiment, rechargeable battery 713 is housed in a housing that is independent of media shell 711. For example, media shell 711 may contain one more rechargeable batteries 713 each with its own battery housing or casing. Herein, rechargeable battery may refer to the essential components of the rechargeable battery, or may refer to a packaging that contains the essential components of the rechargeable battery. Media shell interface 712 is coupled (i.e., a direct or indirect connection) to rechargeable battery 713 to make possible an operation of removable media battery pack 710 as a power source for a media accessor. The same contacts, or different contacts, are coupled to rechargeable battery 713 to make possible an operation of recharging removable media battery pack 710, as will be discussed.

In one embodiment, rechargeable battery 713 comprises one or more batteries such as lithium-ion, lithium polymer, nickel-metal-hydride, nickel-cadmium, lead acid, gel battery, reusable alkaline battery, or any other rechargeable battery as is known to those having ordinary skill in the art. In another embodiment, rechargeable battery 713 alternatively or concurrently comprises one or more capacitors, one or more supercapacitors, or any other devices capable of storing an electrical charge as is known to those having ordinary skill in the art. In yet another embodiment, rechargeable battery 713 alternatively or concurrently comprises one or more fuel cells, such as but without limitation, alkaline fuel cells, direct-methanol fuel cells, molten-carbonate fuel cells, phosphoric-acid fuel cells, proton-exchange fuel cells, reversible fuel cells, direct borohydride fuel cells, solid-oxide fuel cells, zinc fuel cells, water cells, air fuel cells, or any other device capable of generating an electrical charge as is known to those having ordinary skill in the art. When employed in rechargeable battery 713, a fuel cell may use a number of different fuel sources or consumed reactants, such as but without limitation, hydrogen, oxygen, or any other fuel as is known to those having ordinary skill in the art.

The form of media shell interface 712 is dependent upon the form of rechargeable battery 713 and therefore may include any type of interface, including, but not limited to, an electrical interface, an inductive interface, a fuel cell interface, and any combination thereof. In one embodiment, media shell interface 712 employs one or more contacts affixed to an external surface of media shell 701 where the form of the contacts may comprise electrical contacts for electrically coupling energy to charge battery 713 and/or inductive contacts for inductively coupling energy to charge battery 713 and/or fuel cell contacts for filling or charging battery 713 with fuel in dependence upon the form of rechargeable battery 713.

Media shell interface 712 provides a means for charging battery 713 for the purpose of storing power. Media shell interface 712 also provides a means for discharging battery 713 for the purpose of supplying power to a media accessor.

As such, media shell interface 712 may comprise the same contacts for charging and discharging battery 713, or may comprise different contacts. When different charging and discharging contacts are employed, the contacts may be dissimilar. For example, removable media battery pack 710 may comprise fuel cell contact(s) for charging the rechargeable battery 713, while it may comprise electrical contacts for discharging the battery 713.

Removable media battery pack 710 may optionally include a battery charging circuit 714 electrically coupling media shell interface 712 to rechargeable battery 713 to control a charging and/or a discharging of rechargeable battery 713 as would be appreciated by those having ordinary skill in the art.

Figure 9:
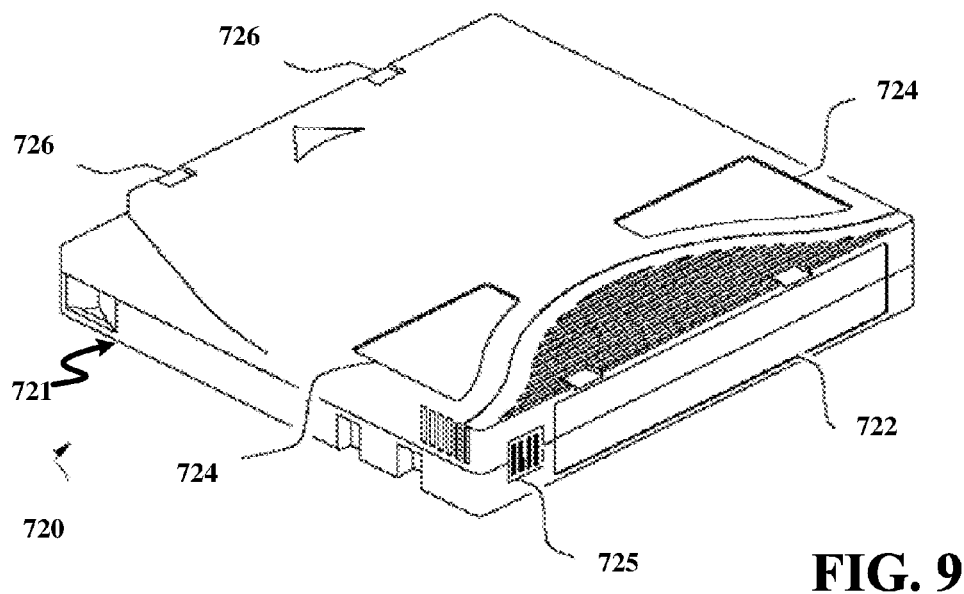
FIGS. 9 and 10 respectively illustrate front and rear isometric views of an exemplary embodiment of the removable media battery pack illustrated in FIG. 8 in accordance with the present invention.
Figure 10:
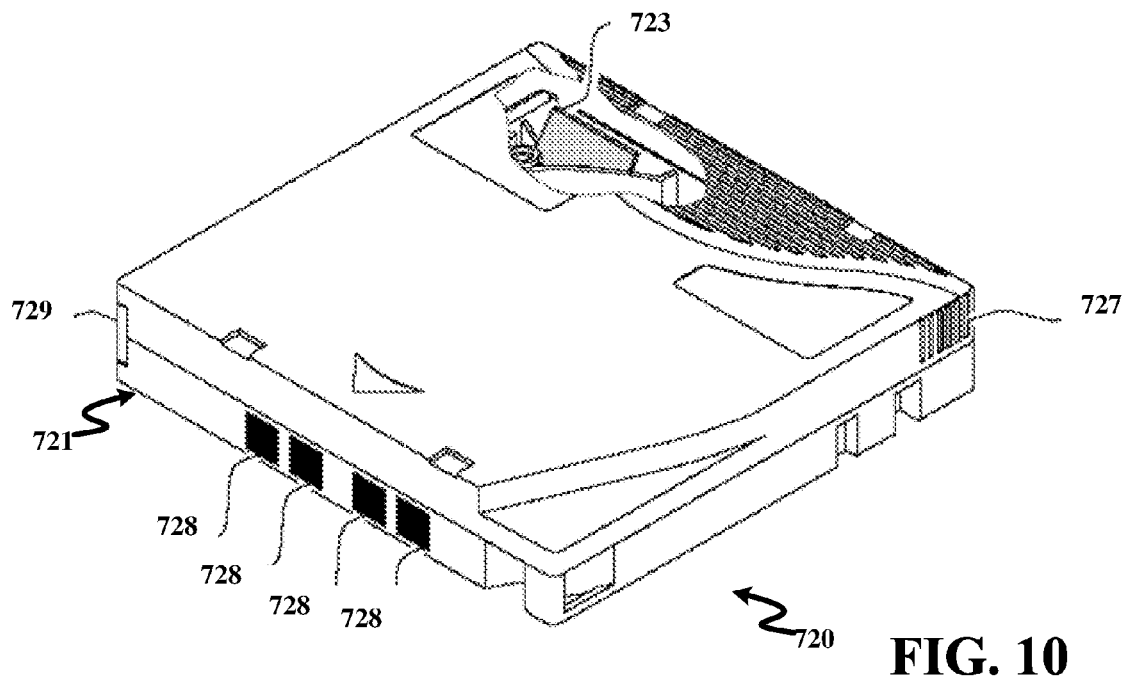

FIGS. 9 and 10 illustrates an exemplary removable media battery pack 720 including a media shell 721 of an LTO tape cartridge having a bar code label location 722 on a front side of an external surface of media shell 721 and an optional cartridge memory 723 (shown in a cutaway view) disposed within media shell 721 as would be appreciated by those having ordinary skill in the art. Also disposed within media shell 721 are a rechargeable battery and an optional battery charging circuit (not shown for clarity purposes).

A media shell interface in the form of electrical contacts 724-729 are affixed to, or integrated with, the external surface of media shell 721. Specifically, a pair of electrical contacts 724 are affixed to a top surface of media shell 721. A multi-conductor pad 725 is affixed to the front surface of media shell 721. A pair of electrical contacts 726 are affixed to the top and rear surfaces of media shell 721. A pair of electrical contacts 727 on the side surfaces of media shell 721. Four (4) electrical contacts 728 are affixed to the rear surface of media shell 721. An electrical contact 729 is affixed to a rear surface of media shell 721. It should be noted that these contacts are meant to provide examples of where different contacts may be located on a particular type of removable media cartridge and one skilled in the art will recognize that only one or two contacts would be required to implement the invention.

As known to those having ordinary skill in the art, LTO tape cartridges are usually placed in storage shelves with the front of the cartridge (the bar code label end) facing out. This allows the media accessor to read the bar code label. When an automated data storage library uses the media accessor to move the LTO tape cartridge to/from a media storage shelf, the front of the LTO tape cartridge (the bar code label end) is usually facing into the media gripper of the media accessor. Thus, in the case of removable media battery pack 720, electrical contacts 726 may be used to charge the rechargeable battery, while electrical contacts 724 may be used to discharge the rechargeable battery. Alternatively, electrical contacts 724 could be used for charging and discharging the rechargeable battery.

When media shell 721 is integrated with electrical contacts as shown in FIGS. 9 and 10, the electrical contacts may be structurally configured as springs, clips, metal surfaces, or any type of structural configuration of electrical contacts as is known to those having ordinary skill in the art. When media shell 721 is alternatively or concurrently integrated with inductive contacts (not shown), the inductive contacts may be structurally configured as plates, coils, windings, or any other type of structural configuration of inductive contacts as is known to those having ordinary skill in the art. When media shell 721 is alternatively or concurrently integrated with fuel cell contacts (not shown), the fuel cell contacts may be structurally configured as ports, plugs, jacks, holes, doors, connectors, or any other method of providing fuel to the fuel cell as is known to those having ordinary skill in the art. Herein, contacts may refer to electrical contacts, inductive contacts, or fuel cell contacts. In addition, a battery that is receiving power or fuel is referred to as charging and a battery that is supplying power is referred to as discharging. Discharging may also refer to a battery conditioning operation, as is known to those of skill in the art.

FIG. 11 illustrates a non-recharging media storage shelf 800 including a media storage slot 801 for securely storing removable media cartridge 700 (FIG. 7) or removable media battery pack 710 (FIG. 8) therein as would be appreciated by those having ordinary skill in the art.

By comparison, FIG. 12 illustrates a recharging media storage shelf 810 of the present invention including a media storage slot 811 for securely storing removable media cartridge 700 or removable media battery pack 710 therein as would be appreciated by those having ordinary skill in the art, and for facilitating the charging of rechargeable battery 713 of removable media battery pack 710. To this end, media storage slot 811 may be a modification of media storage slot 801 involving an integration of a media storage slot interface 812 into media storage slot 801. This may be accomplished without inhibiting the ability of media storage slot 801 in securely storing removable media cartridge 700 or removable media battery pack 710 therein. Thus, this modification of media storage slot 801 may provide recharging media storage shelf 810 with a physical configuration parallel to the physical configuration of non-recharging media storage shelf 800 whereby removable media cartridge 700 and removable media battery pack 710 can be stored as needed within an automated data storage library. Alternatively, the recharging media storage shelf 810 may not resemble non-recharging media storage shelf 800. In this case, the physical configuration of the two media storage shelves may not be parallel at all. For example, libraries typically comprise drive slots for holding data storage drives. One or more of these drive slots may be used to hold recharging media storage shelves 810. This may be advantageous because libraries typically have service access and power near the drive slots. In addition, the recharging media storage shelf 810 may be configured to look like a drive or a drive canister to take advantage of the available power and service access.

A coupling of media shell interface 712 (FIG. 8) and media storage slot interface 812 establishes a means of providing power in the form of electricity, electromagnetic energy, or fuel/chemicals to rechargeable battery 713 from an internal library power source (not shown) and/or an external library power source coupled to media storage slot interface 812. As such, the forms of media shell interface 712 and storage slot media interface 812 are mutually dependent in view of facilitating a coupling between media shell interface 712 and media storage slot interface 812 for purposes of charging rechargeable battery 713. An exemplary embodiment of recharging media storage shelf 810 involves a modification of media storage shelf 16 (FIG. 2) with electrical contacts capable of physically contacting electrical contacts 726 (FIG. 9) when removable media battery pack 720 is securely stored within the media storage slot of media storage shelf 16 as would be appreciated by those having ordinary skill in the art.

FIG. 13 illustrates a non-gripper interface media accessor 900 that includes a media shell gripper 901 and an accessor control circuit 902 for controlling an operation of media shell gripper 901 in moving removable media cartridges 700 (FIG. 7) between storage shelves and data storage drives of an automated data-storage library, and/or for controlling an operation of media shell gripper 901 in moving removable media battery packs 710 (FIG. 8) between storage shelves and accessor storage slots 1001 (FIG. 16) as will be discussed. Herein, accessor control circuit may refer to part or all of the accessor electrical system including, but not limited to, electronics, controllers, processors, motors, actuators, relays, sensors, etc.

By comparison, gripper interface media accessor 910 (FIG. 14) of the present invention includes a media shell gripper 911 and accessor control circuit 902 for controlling an operation of media shell gripper 911 in moving removable media cartridges 700 (FIG. 7) between storage shelves and data storage drives of an automated data-storage library, and/or for controlling an operation of media shell gripper 911 in moving removable media battery packs 710 (FIG. 8) between storage shelves and media shell gripper 911, and/or between storage shelves and accessor storage slots 1001 (FIG. 16) as will be discussed. The main difference between non-gripper interface accessor 900 and gripper interface accessor 910 is a media shell gripper interface 912 for providing power to part or all of the accessor control circuit 902 while a removable media battery pack 710 (FIG. 8) is present in media shell gripper 911. In addition, media shell gripper interface 912 may also be used to charge the removable media battery pack 710, as will be discussed. To this end, media shell gripper 911 may comprise a modification of media shell gripper 901 involving an integration of a media shell gripper interface 912 into media shell gripper 911 without inhibiting the ability of media shell gripper 911 in physically engaging a removable media cartridge 700 and a removable media battery pack 710. Thus, this modification of media shell gripper 901 provides gripper interface media accessor 910 with a physical configuration parallel to the physical configuration of non-gripper interface media accessor 900 whereby removable media cartridge 700 and/or removable media battery pack 710 can be transported as needed within an automated data storage library.

Figure 15:
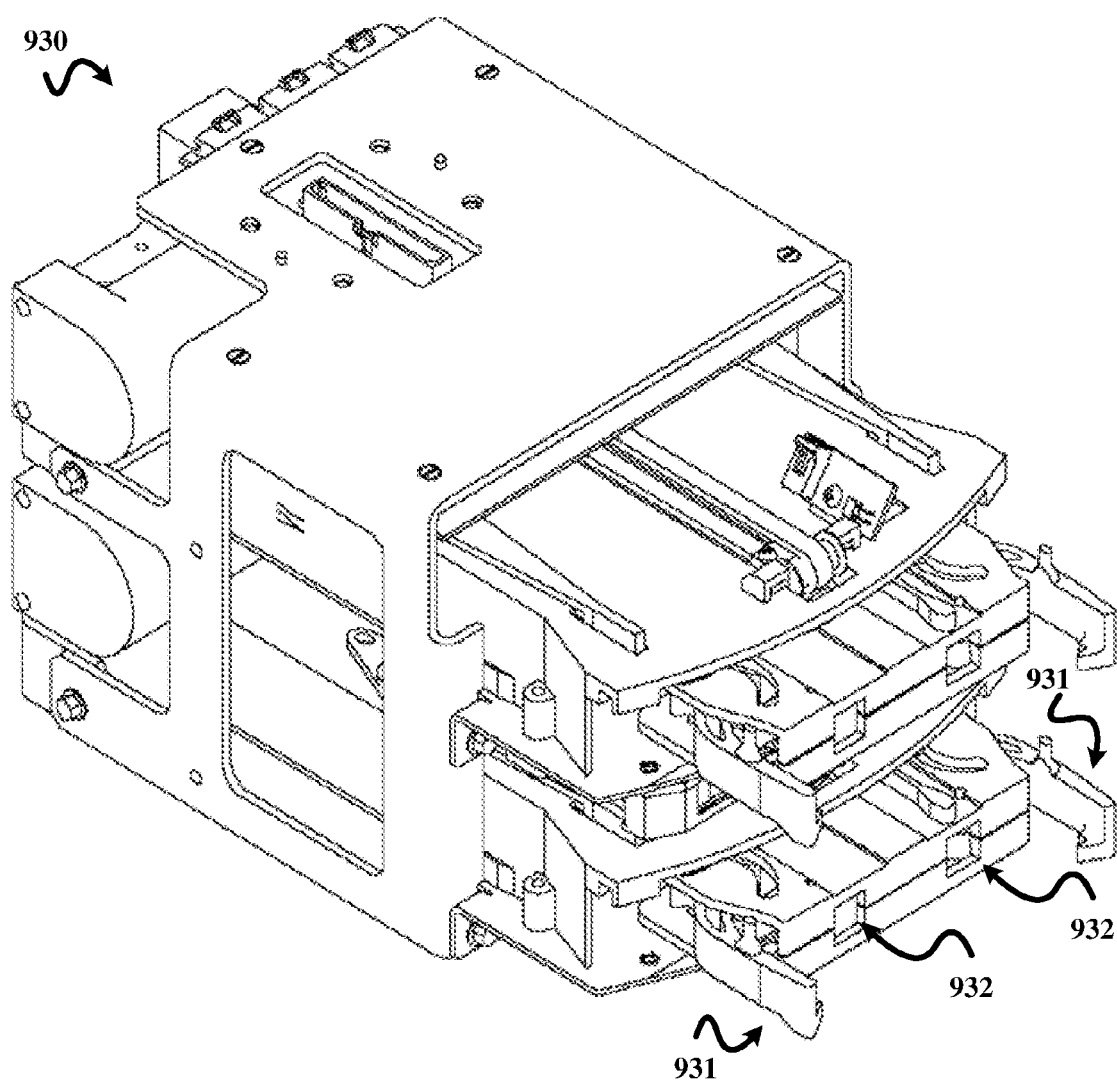
FIG. 15 illustrates an isometric view of one embodiment of a media shell gripper illustrated in FIG. 14 in accordance with the present invention.

A coupling of media shell interface 712 (FIG. 8) and media shell gripper interface 912 establishes a means of providing power in the form of electricity, electromagnetic energy, or fuel/chemicals to media accessor 910 from rechargeable battery 713 (FIG. 8). As such, the forms of media shell interface 712 and media shell gripper interface 912 are mutually dependent in view of facilitating a coupling between media shell interface 712 and media shell gripper interface 912 for purposes of discharging rechargeable battery 713 to thereby supply power to media accessor 910. In one exemplary embodiment as shown in FIG. 15, a media gripper 930 may have a media shell gripper interface 912 in the form of electrical contacts formed on gripper arms 931 and/or electrical contacts 932.

Figure 16:
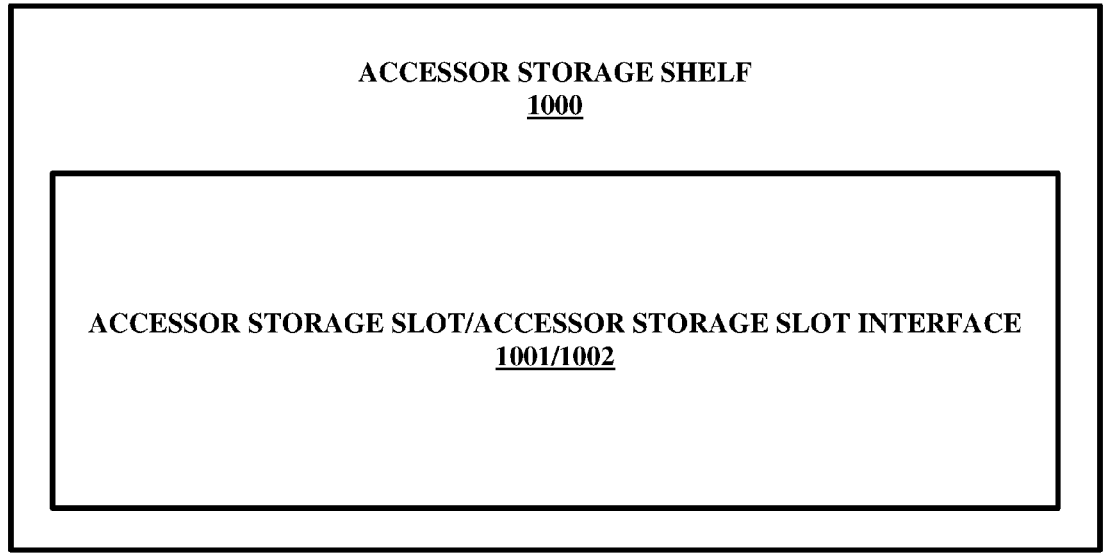
FIG. 16 illustrates a block diagram of an accessor storage shelf in accordance with the present invention.

FIG. 16 illustrates an accessor storage shelf 1000 of the present invention including an accessor storage slot 1001 for securely storing removable media cartridge 700 and/or removable media battery pack 710 therein as would be appreciated by those having ordinary skill in the art, and for providing power to the media accessor (e.g., non-gripper interface media accessor 900 and/or gripper interface media accessor 910) via removable media battery pack 710. To this end, accessor storage slot 1001 may comprise a modification of media storage slot 801 (FIG. 11) involving an integration of an accessor storage slot interface 1002 into media storage slot 801 without inhibiting the ability of media storage slot 801 in securely storing removable media cartridge 700 or removable media battery pack 710 therein. Thus, this modification of media storage slot 801 provides accessor storage shelf 1000 with a physical configuration parallel to the physical configuration of non-charging media storage shelf 800 whereby removable media cartridge 700 and/or removable media battery pack 710 can be stored as needed within an automated data storage library. Alternatively, accessor storage shelf 1000 may not resemble media storage shelf 800 or 810, and therefore, accessor storage slot 1001 may not resemble media storage slot 801 or 811. In this case, the physical configuration of the media storage shelves may not be parallel at all.

A coupling of media shell interface 712 (FIG. 8) and accessor storage slot interface 1002 establishes a means of providing power in the form of electricity, electromagnetic energy, or fuel/chemicals to a media accessor from rechargeable battery 713 (FIG. 8). As such, the forms of media shell interface 712 and accessor storage slot interface 1002 are mutually dependent in view of facilitating a coupling between media shell interface 712 and accessor storage slot interface 1002 for purposes of discharging rechargeable battery 713 to thereby supply power to the media accessor.

Figure 17:
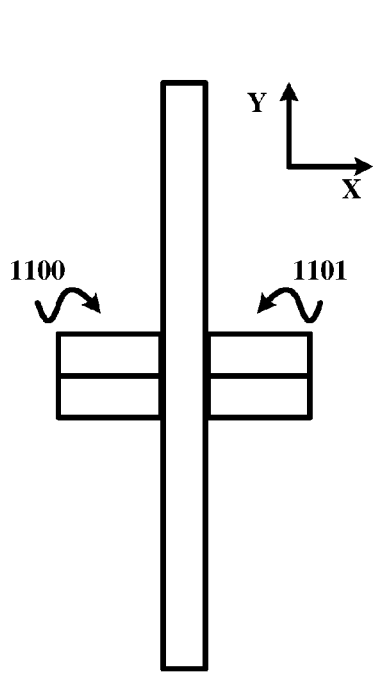
FIG. 17 illustrates a side view of a first exemplary embodiment of the accessor storage shelf illustrated in FIG. 16 in accordance with the present invention.
Figure 18:
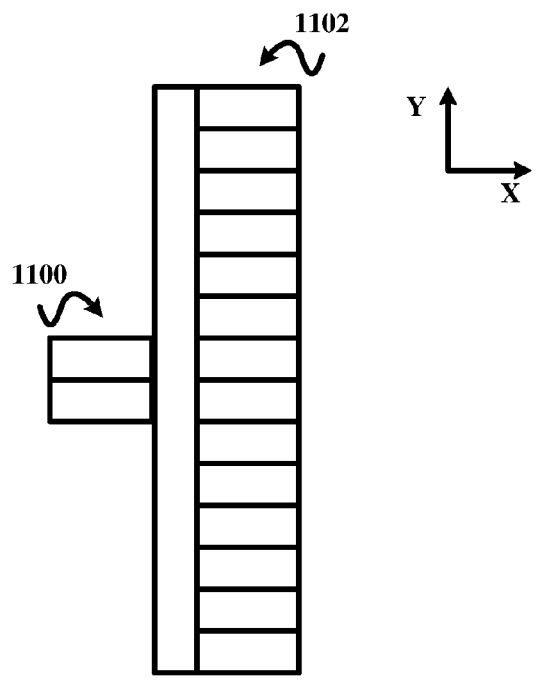
FIG. 18 illustrates a side view of a second exemplary embodiment of an accessor storage shelf illustrated in FIG. 16 in accordance with the present invention.

Accessor storage shelf 1000 is physically coupled to a media accessor to thereby simultaneously move with a media gripper of the media accessor in one or more directions. In one exemplary embodiment as shown in FIG. 17, a pair of media grippers 1100 and a pair 1101 of media storage shelves 1000 are capable of being simultaneously moved in both a Y direction and an X direction of a media accessor. Grippers 1100 can be operated to move or to remove a removable media battery pack 710 from one of the media storage shelves 1000. In a second exemplary embodiment as shown in FIG. 18, a column 1102 of media storage shelves 1000 are capable of being simultaneously moved with media grippers 1100 exclusively in an X direction of a media accessor. Again, grippers 1101 can be operated to move or to remove a removable media battery pack 710 from one of the media storage shelves 1000.

Figure 19:
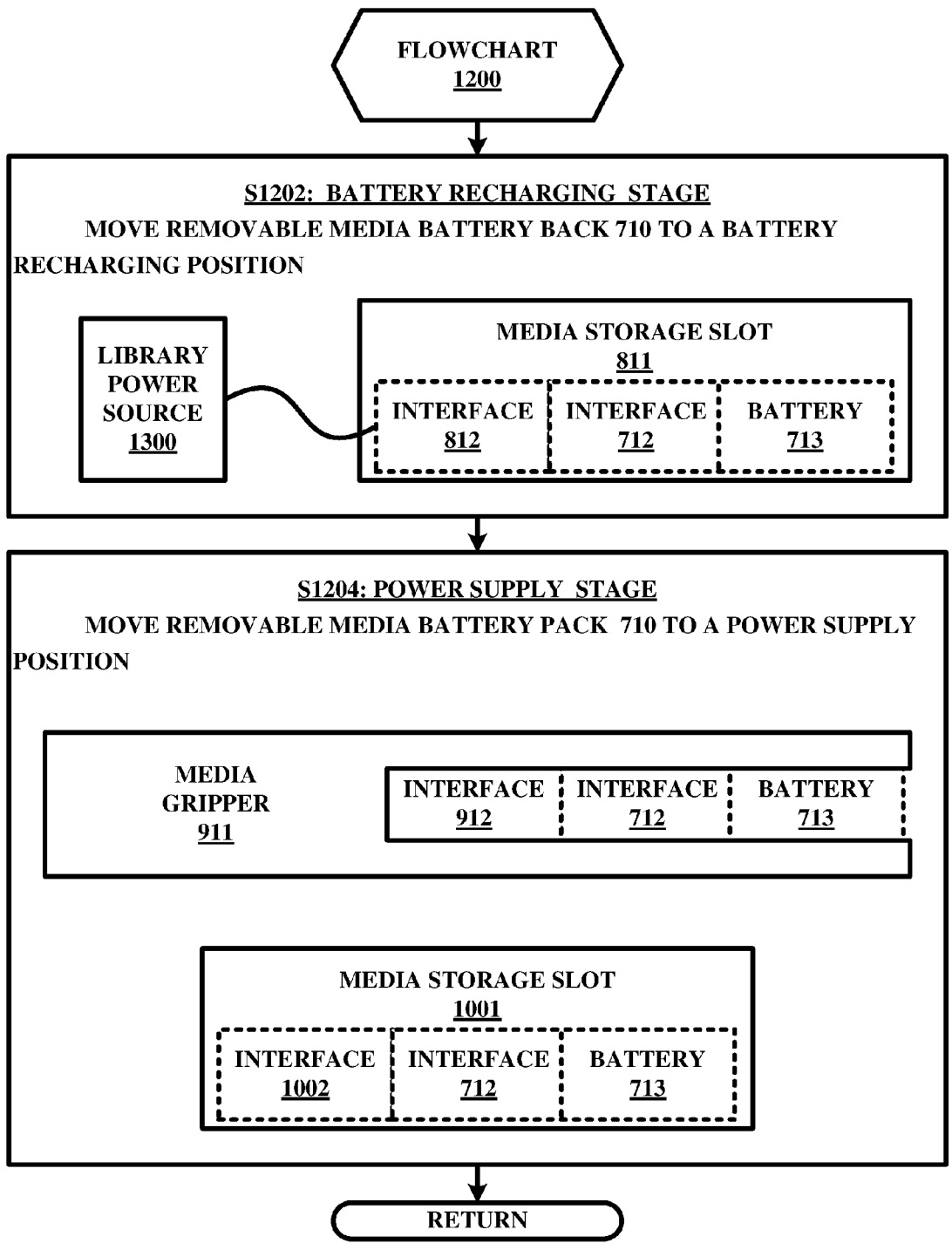
FIG. 19 illustrates a flowchart representative of one embodiment of a removable media battery pack management method in accordance with the present invention.

FIG. 19 illustrates a flowchart 1200 representative of a removable media battery pack management method of the present invention. A battery recharging stage S1202 of flowchart 1200 encompasses a controller of accessor control circuit 902 executing a removable media put operation involving a movement of removable media battery pack 710 to a battery charging position, which is defined as removable media battery pack 710 being physically inserted within media storage slot 811 of recharging media storage shelf 810 whereby interfaces 712 and 812 are electrically coupled to make possible the charging of battery 713 by a library power source 1300.

A power supply stage S1204 of flowchart 1200 encompasses the processor of accessor control circuitry 902 executing a removable media get operation involving a movement of removable media battery pack 710 to a power supply position, which is defined as removable media battery pack 710 being physically engaged by media gripper 911 whereby interfaces 712 and 912 are coupled to make possible a powering of media accessor 910 via a discharging of battery 713, or which is defined as removable media battery pack 710 being physically inserted within accessor storage slot 1001 of accessor storage shelf 1000 whereby interfaces 712 and 1002 are coupled to make possible a powering of a media accessor via a discharging of battery 713.

Referring to FIGS. 7-19, those having ordinary skill in the art will appreciate various advantages and benefits of the present invention, such as, for example, the flexibility in designing an automated data-storage library.

In particular, the present invention may be implemented with one or more recharging media storage shelves 810 (FIG. 12). These shelves may include one or more special purpose storage shelves that are only used for holding and/or charging removable media battery packs 710 (FIG. 8), and/or they may include one or more dual purpose storage shelves that are used for holding removable media cartridges 700 (FIG. 7) as well as being used to hold and/or charge removable media battery pack 710 (FIG. 8). In addition, the present invention may not use recharging media storage shelves 810 at all. For example, the removable media battery pack 710 may include one or more fuel cell batteries. Fuel cell batteries are more difficult to fuel in an automated environment, and the batteries tend to hold more charge than other rechargeable batteries. As a result, it may be desirable to use some other method of charging fuel cell batteries. In this case, an operator or service person may fill the fuel cell batteries, or the batteries may be considered disposable without being recharged. The library would not provide any method for charging the battery pack as it would only need to be able to move the batteries from a media storage shelves 800 (FIG. 11) to a physical engagement with a media shell gripper 911 (FIG. 14) and/or a physical insertion within accessor storage slot 1001 (FIG. 16). It should be noted that a prior art media accessor (such as non-gripper interface media accessor 900) may be used to implement this invention. For example, non-gripper interface media accessor 900 may be used to move a removable media battery pack 710 to/from an accessor storage shelf because media shell gripper interface 912 is not required if there is an accessor storage slot interface for supplying power to the accessor.

In another embodiment, the accessor storage shelf may provide the power to charge the rechargeable battery 713 as well as using the rechargeable battery 713 to power the accessor control circuit 902. In this embodiment, the media accessor may not move the removable media battery pack 710 every time it is charged and discharged. Different techniques are known for providing burst or intermittent power to a media accessor. For example, the power to charge rechargeable battery 713 may come from intermittent contact with a bus bar that runs along the length of the media accessor travel. When the media accessor stops moving, it may contact the bus bar to receive power. The received power may be used to charge rechargeable battery 713. When the media accessor moves, it may disengage the bus bar and the rechargeable battery 713 may provide power to the media accessor. In another example, the power may come from the media accessor parking in front of a charging station. The media accessor periodically charges rechargeable battery 713 by making contact with one or more charging stations inside the library. In yet another example, the media accessor may receive a small amount of power through rails, bearings, rollers, brushes, inductive coupling, etc. The power may be intermittent or may be small with respect to the potential peak power demands of the media accessor. The intermittent power, or the small amount of power, may charge rechargeable battery 713 such that removable media battery pack 710 would assist with peak power demands, or may actually supply all of the power during peak power demands. Still further, the power may come from some other connection or interface between the media accessor and the library. In the embodiments that involve charging the battery while it is on the accessor, the media accessor may only remove and/or replace rechargeable battery 713 when rechargeable battery 713 encountered a problem or is nearing the end of its life.

In another embodiment, removable media battery pack 710 (FIG. 8) may comprise a fuel tank and the media accessor may comprise a fuel cell. In this embodiment, the fuel tank is the rechargeable battery 713 of the removable media battery pack 710, and it is charged by filling the tank. Removable battery pack 710 supplies power to the media accessor in the form of fuel for the media accessor fuel cell.

While the present invention has been described in an automated data storage library comprising removable media tape cartridges, one skilled in the art will recognize that other removable media libraries, drives, recharging media, and non-recharging media may be used. For example, the media may include magnetic media such as hard disks, floppy disks, magnetic tape, or any other type of magnetic media as is known to those of skill in the art. In addition, the media may include optical media such as CD (Compact Disk), DVD (Digital Versatile Disk), MO (Magneto Optical), optical tape, or any other optical media as is known to those of skill in the art. Still further, the media may include electronic media such as CF (CompactFlash), SD (Secure Digital), xD (xD-Picture), Memory Stick, MMC (MultiMedia Card), PROM (Programmable Read Only Memory), ROM (Read Only Memory), flash PROM, battery backed up RAM (Random Access Memory), MEMS (Micro-ElectroMechanical Systems) based storage, MRAM (Magnetoresistive Random Access Memory) or any other electronic media as is known to those of skill in the art.

The invention describes a removable media battery pack that is configured to be substantially similar to a data storage media cartridge. Doing so simplifies the management and handling of rechargeable batteries because the same, or a similar, gripper design may be used to move the batteries. In addition, the batteries may comprise labels similar to the labels commonly use on data storage cartridges. Cartridge memories and RFID tags may also be used to track and manage the batteries in a similar manner that they are used on data storage cartridges. The media accessor may be used to move batteries into or out of the library through an I/O station similar to how data storage media is moved into or out of the library. For example, the library may determine that a rechargeable battery has failed to hold a proper charge and it may "export" the cartridge through the library I/O station, either automatically, or under operator control using a user interface of the library.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A removable media battery pack for supplying power to a media accessor of an automated data storage library, the removable media battery pack comprising:
    a media shell having a structural configuration operable to be physically engaged by a media shell gripper of the media accessor;
    a data media within the media shell;
    a rechargeable battery disposed within the media shell; and
    a media shell interface integrated with the media shell and coupled to the rechargeable battery to provide power to an accessor control circuit of the media accessor, wherein the accessor control circuit controls an operation of the media shell gripper in moving the media shell.

2. The removable media battery pack of claim 1, further comprising:
    at least one of a bar code label, a cartridge memory, and an RFID tag associated with the media shell.

3. The removable media battery pack of claim 1, wherein the rechargeable battery includes at least one of a lithium-ion battery, a lithium polymer battery, a nickel-metalhydride battery, a nickel-cadmium battery, a lead acid battery, a gel battery, a reusable alkaline battery, a capacitor, a supercapacitor, a fuel tank, and a fuel cell.

4. The removable media battery pack of claim 1, wherein the media shell interface includes at least one of an electrical contact, an inductive contact, and a fuel cell contact.

5. An automated data storage library, comprising:
a media accessor including a media shell gripper and an access control circuit; and
a removable media battery pack including:
- a media shell having a structural configuration operable to be physically engaged by the media shell gripper;
- a rechargeable battery disposed within the media shell; and
- a media shell interface integrated with the media shell and coupled to the rechargeable battery to provide power to the access control circuit of the media accessor, wherein the accessor control circuit controls an operation of the media shell gripper in moving the media shell.

6. The automated data storage library of claim 5, wherein the removable media battery pack further includes at least one of a bar code label, a cartridge memory, and an RFID tag associated with the media shell.

7. The automated data storage library of claim 5, wherein the rechargeable battery includes at least one of a lithium-ion battery, a lithium polymer battery, a nickel-metalhydride battery, a nickel-cadmium battery, a lead acid battery, a gel battery, a reusable alkaline battery, a capacitor, a supercapacitor, a fuel tank, and a fuel cell.

8. The automated data storage library of claim 7,
wherein the media accessor further includes a fuel cell, and
wherein the rechargeable battery includes a fuel tank for supplying fuel to the fuel cell of the media accessor.

9. The automated data storage library of claim 5,
wherein the media accessor further includes a media shell gripper interface integrated with the media shell gripper; and
wherein the removable media battery pack is rechargeable based on a coupling of the media shell interface and the media shell gripper interface.

10. An automated data-storage library, comprising:
a storage shelf including a storage slot;
a media accessor including a media shell gripper and an accessor control circuit, wherein the accessor control circuit controls an operation of the media shell gripper in moving the media shell; and
a removable media battery pack including
- a media shell having a structural configuration operable to be physically engaged by the media shell gripper and to be physically stored in the storage slot;
- a data media within the media shell;
- a rechargeable battery disposed within the media shell; and
- a media shell interface integrated with the media shell and coupled to the rechargeable battery to provide power to the media accessor.

11. The automated data storage library of claim 10, wherein the removable media battery pack further includes at least one of a bar code label, a cartridge memory, and an WID tag associated with the media shell.

12. The automated data storage library of claim 10, wherein the rechargeable battery includes at least one of a lithium-ion battery, a lithium polymer battery, a nickel-metalhydride battery, a nickel-cadmium battery, a lead acid battery, a gel battery, a reusable alkaline battery, a capacitor, a supercapacitor, a fuel tank, and a fuel cell.

13. The automated data storage library of claim 12,
wherein the media accessor further includes a fuel cell; and
wherein the rechargeable battery includes a fuel tank operable to provide fuel for the fuel cell of the media accessor.

14. The automated data storage library of claim 10, further comprising:
a drive slot structurally configured to hold a data storage drive, wherein the storage shelf occupies the drive slot.

15. The automated data storage library of claim 10, wherein the storage slot is a media storage slot.

16. The automated data storage library of claim 15,
wherein the storage shelf further includes a media storage slot interface integrated with the media storage slot; and
wherein the rechargeable battery is rechargeable depending on a coupling of the media shell interface and the media storage slot interface.

17. The automated data storage library of claim 10,
wherein the media accessor further includes an accessor control circuit;
wherein the storage slot is an accessor storage slot;
wherein the storage shelf further includes an accessor storage slot interface integrated with the accessor storage slot; and
wherein the rechargeable battery is operable to provide power to at least a portion of the accessor control circuit depending on a coupling of the media shell interface and the accessor storage slot interface.

18. The automated data storage library of claim 10,
wherein the media accessor further includes
- a media shell gripper interface integrated with the media shell gripper, and
- an accessor control circuit; and
wherein the rechargeable battery is operable to provide power to at least a portion of the accessor control circuit depending on a coupling of the media shell interface and the media shell gripper interface.

19. The automated data storage library of claim 10,
wherein the media accessor further includes a media shell gripper interface integrated with the media shell gripper; and
wherein the removable media battery pack is rechargeable depending on a coupling of the media shell interface and the media shell gripper interface.

20. The automated data storage library of claim 10,
wherein the storage slot is an accessor storage slot;
wherein the storage shelf further includes an accessor storage slot interface integrated with the accessor storage slot; and
wherein the rechargeable battery is rechargeable depending on a coupling of the media shell interface and the accessor storage slot interface.

* * * * *